United States Patent
Ali et al.

(10) Patent No.: US 6,233,323 B1
(45) Date of Patent: *May 15, 2001

(54) DTMF DOWNLOAD TECHNIQUE FOR DIGITAL TELEPHONE DEVICES

(75) Inventors: Syed S. Ali, Allentown; Charles W. Berthoud, Nazareth, both of PA (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,176

(22) Filed: Apr. 10, 1998

(51) Int. Cl.[7] .................................................. H04M 11/00
(52) U.S. Cl. .................................... 379/93.27; 379/93.26; 379/386
(58) Field of Search ............................... 379/93.05, 93.06, 379/93.18, 93.26, 93.27, 93.28, 386, 102.01, 102.02, 102.03

(56) References Cited

U.S. PATENT DOCUMENTS 4,799,254 * 1/1989 Dayton et al. .................... 379/93.26
5,201,045 * 4/1993 Pflueger et al. .................... 395/575
5,553,123 * 9/1996 Chan et al. ...................... 379/102.03
5,852,658 * 12/1998 Knight et al. .................... 379/106.03

FOREIGN PATENT DOCUMENTS

403243050 * 10/1991 (JP) .............................. H04M/11/00
409321893 * 12/1997 (JP) .............................. H04M/11/00

* cited by examiner

Primary Examiner—Curtis A. Kuntz
Assistant Examiner—Melur Ramakrishnaiah
(74) Attorney, Agent, or Firm—William H. Bollman

(57) ABSTRACT

The present invention utilizes common hardware and software routines already present in most digital telephone devices, e.g., a DTMF detector; to download data over a telephone line to a digital telephone device. Each symbol of a numeric system, e.g., a hexadecimal system, used to represent the data is associated with a DTMF tone pair. The DTMF tone pair is downloaded from a data source such as a manufacturer of the digital telephone device, to the digital telephone device using a telephone line. Other tones may be used to provide control signals between the data source and the digital telephone device. Thus, using common and inexpensive routines in a typical digital telephone device, the expense of a modem or other conventional data communication device is not necessary to receive data.

28 Claims, 5 Drawing Sheets

FIG. 2

| DATA | DTMF | PAIR |
|---|---|---|
| 0H | 697 Hz | 1209 Hz |
| 1H | 697 Hz | 1336 Hz |
| 2H | 697 Hz | 1477 Hz |
| 3H | 697 Hz | 1633 Hz |
| 4H | 770 Hz | 1209 Hz |
| 5H | 770 Hz | 1336 Hz |
| 6H | 770 Hz | 1477 Hz |
| 7H | 770 Hz | 1633 Hz |
| 8H | 852 Hz | 1209 Hz |
| 9H | 852 Hz | 1336 Hz |
| AH | 852 Hz | 1477 Hz |
| BH | 852 Hz | 1633 Hz |
| CH | 941 Hz | 1209 Hz |
| DH | 941 Hz | 1336 Hz |
| EH | 941 Hz | 1477 Hz |
| FH | 941 Hz | 1633 Hz |

AUDIBLE TONES COMMONLY USED IN NORTH AMERICA

| TONE | FREQUENCIES (Hz) | CADENCE |
|---|---|---|
| DIAL | 350 + 440 | CONTINUOUS |
| BUSY (STATION) | 480 + 620 | 0.5 s ON, 0.5 s OFF |
| BUSY (NETWORK CONGESTION) | 480 + 620 | 0.2 s ON, 0.3 s OFF |
| RING RETURN | 440 + 480 | 2 s ON, 4 s OFF |
| OFF-HOOK ALERT | MULTIFREQUENCY HOWL | 1 s ON, 1 s OFF |
| RECORDING WARNING | 1400 | 0.5 s ON, 15 s OFF |
| CALL WAITING | 440 | 0.3 s ON, 9.7 s OFF |

DTMF DOWNLOAD TECHNIQUE FOR DIGITAL TELEPHONE DEVICES

BACKGROUND OF THE INVENTION

1. Field of the Invention

This invention relates generally to the downloading of data to a digital telephone device. More particularly, it relates to the transmission of data to a digital telephone device over an analog communication link such as a telephone line using dual tone multiple frequencies (DTMF).

2. Background of Related Art

Digital telephone devices having processors and memory storage have become commonplace. For instance, digital voice messaging systems have become an everyday requirement in today's society. Early voice messaging systems comprised mechanical systems and magnetic cassette tapes. However, cassette tapes were disadvantageous because of the mechanics and time required. More recently, particularly as the size of memory has increased in density while at the same time decreased in price, digital voice messaging systems have gained in popularity. Digital voice messaging systems store incoming voice messages in digital memory, reducing the mechanics and cost, and increasing the reliability over conventional analog voice messaging systems.

Most digital telephone devices include a processor, memory and the capability to generate and detect dual tone multi frequency (DTMF) tones (also known as 'touch-tone') on a telephone line. DTMF tones were originally used by the telephone system to communicate keys pressed when dialing. Using this conventional method, each key on the telephone's 4×4 (or 3×4) keypad generates two simultaneous tones, one for the row and one for the column. The two simultaneous tones are decoded to determine which key was pressed.

FIG. 5 depicts the conventional 4×4 keypad including 16 keys. A 3×4 keypad is one which does not include keys 313–316.

Each of the 16 keys 301–316 corresponds to a unique combination of row and column DTMF frequencies. For instance, if any of the keys in the first row containing keys 301, 302, 303, 313 are pressed, then a tone from the low frequency group, i.e., 697 Hz, is output. A second tone from the high frequency group corresponding to the row of the key is also output simultaneously with the first tone. Thus, if key 301 is pressed, the dual tones 697 Hz and 1209 Hz are output simultaneously. Similarly, if key 302 is pressed, the dual tones 697 Hz and 1336 Hz are output, etc.

FIG. 6 shows a conventional digital telephone device 10, i.e., a telephone answering device (TAD) 10. The TAD 10 includes a telephone line interface (TLI) 48, which interfaces to a telephone line 14 from a central office 13. A processor (such as a microprocessor, microcontroller, and/or digital signal processor (DSP) 18 controls the operation of the TAD 10. The processor 18 receives input from a local 4×4 or 3×4 keypad 36, and displays information relating to the operation of the device on a display 27. The processor 18 also controls the recording and playback of voice messages through a voice recorder/playback module 20, including a microphone 106 and speaker 108.

The TAD 10 further includes memory 202 which includes preprogrammed application programs in program memory 16. The TAD 10 also includes a DTMF generator 212 and a DTMF decoder 204. The DTMF generator 212 and/or the DTMF decoder 204 may be software routines operated by the processor, or may be separate hardware elements within the TAD 10.

The DTMF generator 212 generates analog tones through a codec associated with the processor 18 or voice recorder/playback module 20. The DTMF decoder 204 is typically used, e.g., in remote operation of the TAD 10 to decode which of keys 301–316 are pressed at a remote telephone device. Thus, for instance, the TAD 10 may prompt a remote user calling in to the TAD 10 over a telephone line to "press 1" if they want to listen to their messages, or "press *" if they want to record a message, or "press #" if they want to change their personal greeting. The DTMF decoder 204 will decode the two (dual) frequencies (i.e., DTMF tones) of a response by the user to determine which of keys 301–316 have been pressed. Silence periods are conventionally used between DTMF tones to distinguish between separate keypresses. Thus, if the two frequencies 941 Hz and 1477 Hz are detected, the keypress is interpreted as the user selecting the pound sign "#" key, and the processor 18 would, e.g., proceed to operate the routines necessary to change the outgoing greeting message of the TAD 10.

The programs for the processors and voice prompts in digital telephone devices are typically stored in digital memory at the time that the digital telephone device is manufactured, i.e., while at the factory. The digital telephone devices are tested and shipped to consumers, with pre-installed programs and voice prompts already stored in memory. The memory is typically physically inaccessible to the user without disassembly of the digital telephone device.

Environmental conditions or other factors may cause the contents of the memory to become corrupted. For instance, it is possible for an electrical surge such as may be caused by a lightning strike to disrupt the contents of the memory without destroying the operation of the memory. Moreover, newer features may become available after the digital telephone devices are first shipped, and thus the pre-stored program may become outdated, obsoleting the digital telephone device.

Thus, after installation of the digital telephone device, it may become desirable to re-program, re-store or upgrade portions of the contents of memory, e.g., programs and/or voice prompts. However, conventional digital telephone devices do not allow a user direct access to the memory therein. Nor do such conventional digital telephone devices allow a user to reprogram the memory in the field. Rather, at best, the digital telephone devices must be shipped back to the factory where the memory is either reprogrammed or replaced, or the entire digital telephone device is discarded.

There is thus a need for digital telephone devices having the capability to allow a user to reprogram, re-store or replace the contents of memory after the digital telephone device is installed in the field, without the need to ship the digital telephone device back to the factory.

SUMMARY OF THE INVENTION

In accordance with the principles of the present invention, a data download receiver in a digital telephone device comprises a DTMF decoder, and a table associating each of sixteen unique DTMF tone pairs with a corresponding unique hexadecimal digit. A DTMF download control module is adapted to receive a sequence of DTMF information, and to determine a sequence of hexadecimal digits corresponding to the sequence of DTMF information.

A method of transmitting data in accordance with the present invention comprises associating each symbol of a numeric system with a unique one of a plurality of dual tone multi frequency tone pairs. Each numeral of the data is transmitted using an associated one of the plurality of dual tone multi frequency tone pairs.

A method of receiving trickle downloaded data over a telephone line in accordance with the present invention comprises associating each of 16 unique DTMF tone pairs with a unique symbol of a hexadecimal numeric system. A DTMF sequence of separate DTMF tone pairs is received over the telephone line. A sequence of separate digits of data is determined based on the association of the 16 unique DTMF tone pairs with the unique digits of the hexadecimal numeric system. The sequence of separate digits of data is moved to a block of non-volatile memory.

Another method of receiving trickle downloaded data over a telephone line in accordance with the present invention comprises associating each of 16 unique DTMF tone pairs with a unique symbol of a hexadecimal numeric system. A DTMF sequence of separate DTMF tone pairs is received over the telephone line. A data stream and error checking information is determined based on the association of the 16 unique DTMF tone pairs with the unique digits of the hexadecimal numeric system. An error check is performed on the data stream based on the error checking information.

A method of downloading data to a digital telephone device in accordance with the present invention comprises associating in the digital telephone device each of 16 unique DTMF tone pairs with a unique symbol of a hexadecimal numeric system. A telephone interconnection is established between the digital telephone device and a data source. A sequence of DTMF tones from the data source is received in the digital telephone device, and a data stream is determined based on the association of the DTMF tone pairs with the digits of the hexadecimal numeric system.

BRIEF DESCRIPTION OF THE DRAWINGS

Features and advantages of the present invention will become apparent to those skilled in the art from the following description with reference to the drawings, in which:

FIG. 2 is a table showing one embodiment of the assignment of DTMF tones commonly used in North America with hexadecimal digits.

DETAILED DESCRIPTION OF ILLUSTRATIVE EMBODIMENTS

The present invention utilizes common hardware and software routines already present in most digital telephone devices, e.g., a DTMF detector, to download data over a telephone line to a digital telephone device. Thus, using common and inexpensive routines in a typical digital telephone device, the expense of a modem or other conventional data communication device is not necessary to receive data.

Figure 1:
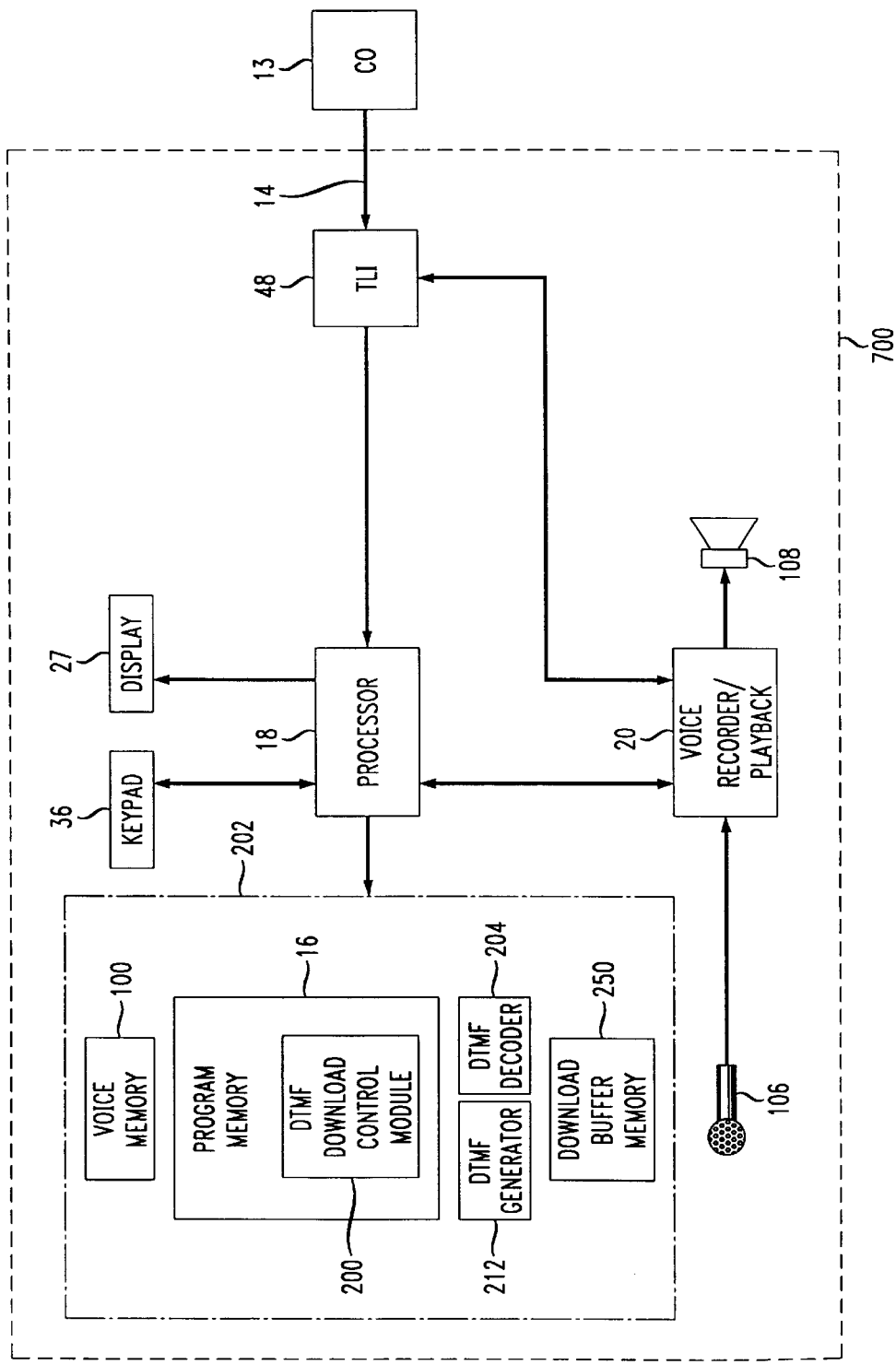
FIG. 1 shows a digital telephone device including a dual tone multi frequency (DTMF) download control module in accordance with the principles of the present invention.

FIG. 1 shows a digital telephone device including a dual tone multi frequency (DTMF) download module in accordance with the principles of the present invention. While the present invention is described with respect to its application in a telephone answering device (TAD), it is equally applicable to any digital telephone device.

Figure 6:
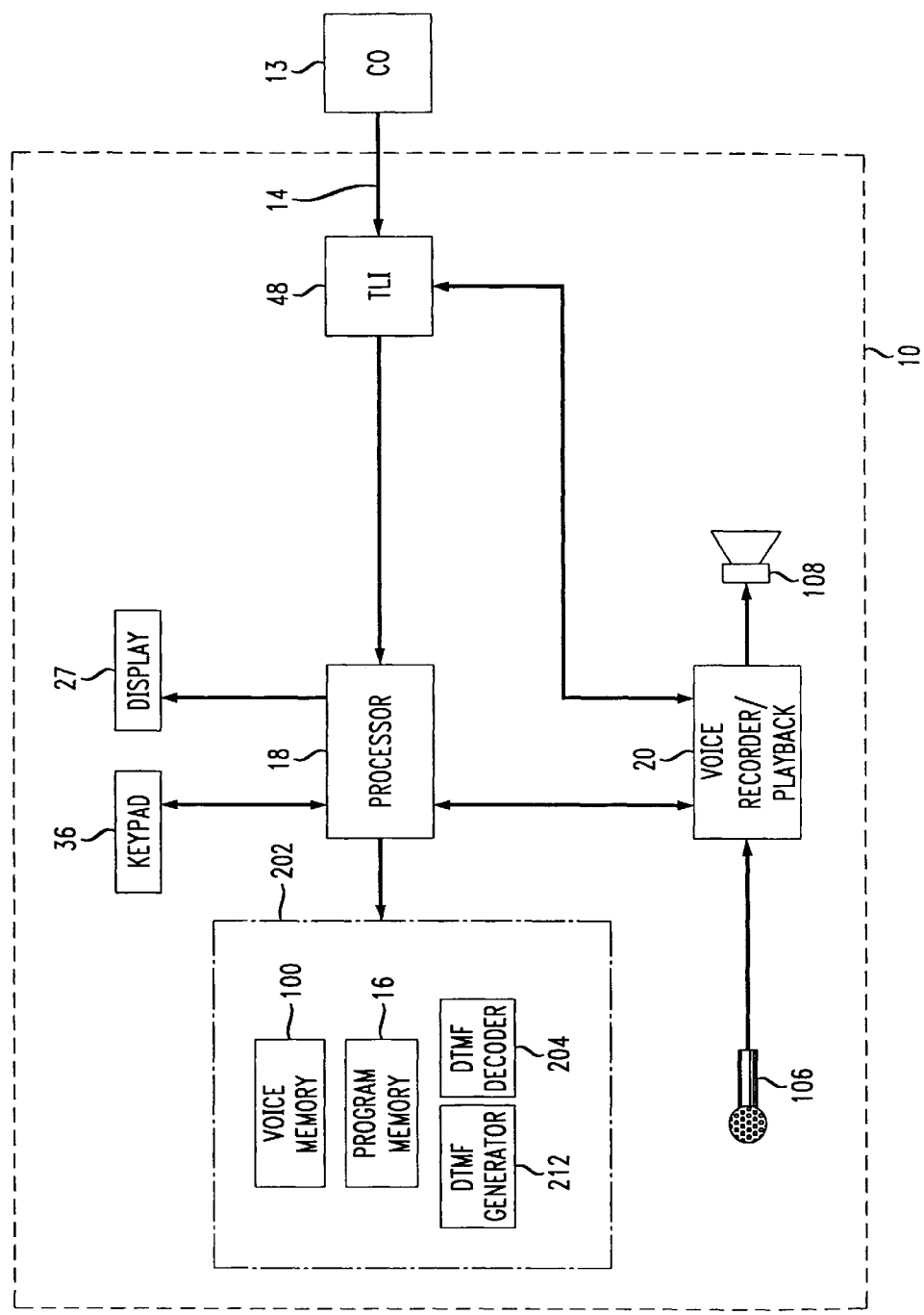
FIG. 6 shows a conventional digital telephone device, i.e., a digital voice messaging system.

In FIG. 1, an otherwise conventional digital telephone device, i.e., TAD 700, includes a DTMF download control module 200 and download buffer memory 250 within memory 202. Of course, the DTMF download control module 200 and/or the download buffer memory 250 could be located outside of the memory 202, e.g., in separate memory, within the principles of the present invention. The processor 18, keypad 36, display 27, voice recorder/playback module 20 and TLI 48 are otherwise as in a conventional digital telephone device such as the TAD 10 shown in FIG. 6.

The routines in the DTMF download control module 200 control the download of data from a remote location such as from a technical support office of the manufacturer of the digital telephone device 700. The DTMF download control module 200 may be invoked either by local control and/or by remote control.

In the disclosed embodiment, under local control, the user first calls the telephone number of the data source and enters a condition wherein the data source is ready to download data to the user's digital telephone device 700. Then the user may press a dedicated key or key a predetermined code in the keypad 36, either of which is interpreted by the processor 18 as requesting a download of data from a called party already on the telephone line.

The present invention may also be practiced with auto-dialing techniques, wherein the digital telephone device 700 automatically dials a location, communicates with the source to receive a download of data, and hangs up. However, the user may manually dial the data source, manually work through any necessary audible menus, and then invoke the DTMF download control module 200 to simply download the desired data.

Under remote control, the data source may call in to the telephone number of the digital telephone device 700, and send a predetermined code via DTMF tones to the user's digital telephone device 700 requesting a data download. Upon interpretation of this request, the processor 18 may then automatically invoke operation of the DTMF download control module 200 to download the desired data. After the data download is complete, the data source may hang up, and the digital telephone device 700 may return to its normal operation.

The maximum data rate is dictated by the capabilities of DTMF detection by the DTMF decoder 204. For instance, allowing 50 milliseconds (mS) for the detection of each DTMF tone pair, data rates up to 20 digits per second, or 80 bits per second (based on a hexadecimal system) or more are possible. This is a relatively slow data rate and may be referred to as a 'trickle download'.

FIG. 2 shows a table associating each of the 16 conventional DTMF frequency pairs commonly used in North America to represent a hexadecimal symbol. The present invention is equally applicable to binary, octal, decimal or other numeric system as well as it is to a hexadecimal numeric system as in the present embodiment. Moreover, while the particular DTMF frequencies shown in the table of FIG. 2 are those which are currently in common use in North America, the present invention relates to any appropriate frequencies used for DTMF type signaling.

In FIG. 2, the symbol 0H (zero hexadecimal) is represented by the DTMF tone pair of 697 Hertz (Hz) and 1209 Hz. Similarly, the symbol 1H is represented by DTMF tones 697 Hz and 1336 Hz, the symbol 2H by DTMF tones 697 Hz and 1477 Hz, the symbol 3H by 697 Hz and 1633 Hz, the symbol 4H by 770 Hz and 1209 Hz, the symbol 5H by 770 Hz and 1336 Hz, the symbol 6H by 770 Hz and 1477 Hz, the symbol 7H by 770 Hz and 1633 Hz, the symbol 8H by 852 Hz and 1209 Hz, the symbol 9H by 852 Hz and 1336 Hz, the symbol AH (10 in the decimal system) by 852 Hz and 1477 Hz, the symbol BH by 852 Hz and 1633 Hz, the symbol CH by 941 Hz and 1209 Hz, the symbol DH by 941 Hz and 1336 Hz, the symbol EH by 941 Hz and 1477 Hz, and the symbol FH by 941 Hz and 1633 Hz.

Of course, it is important to note that each of the digits of the chosen numeric system, e.g., the hexadecimal system is uniquely represented by one of the 16 possible DTMF tone pairs. Thus, each of the digits may be represented by any of the 16 possible DTMF tone pairs, so long as the same DTMF tone pair does not also represent another digit.

As the data is downloaded, it is placed in a download buffer memory 250 until the download is complete. After the download of data is complete and the downloaded data is in the download buffer memory 250, the data is relocated by the processor 18 to the desired location elsewhere in the memory 202.

The download buffer memory may be eliminated e.g., by adapting the DTMF download control module 200 to store the received data directly into the desired locations in the digital telephone device 700. However, this technique would make at least the affected routines unworkable until the download is completed.

Figure 3:
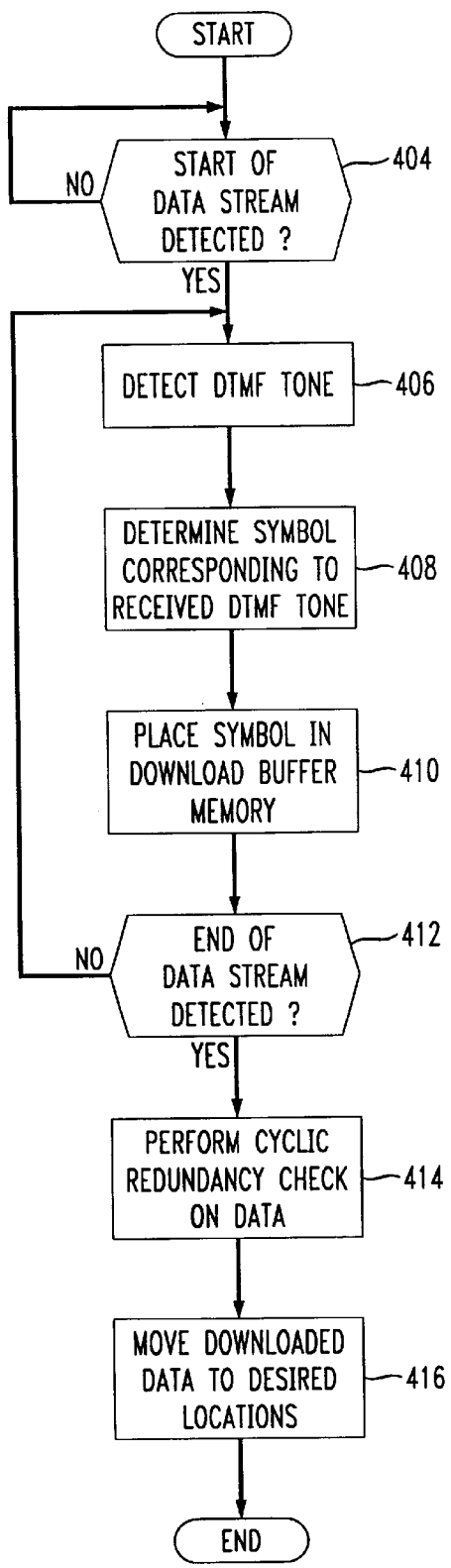
FIG. 3 shows the process of the routines in the DTMF download control module of FIG. 1 in more detail.

FIG. 3 shows one embodiment of the process of the DTMF download control module 200 once the download of data is requested, either locally or remotely, and the DTMF download control module 200 is invoked by the processor 18.

In particular, in step 404, the DTMF download control module 200 enters a wait loop until it is synchronized with the source of the data. For instance, the DTMF download control module 200 may monitor the output of the DTMF decoder 204 until a first symbol is received. Alternatively, to provide a more robust system, the DTMF download control module 200 may look for a predetermined start code comprising a plurality of digits, or a header of information relating to a packet of data from the data source.

After the start of the data stream from the data source is detected, the process continues to step 406, where the DTMF tones of the first symbol are detected by the DTMF decoder 204.

After detection, the processor 18 determines the assigned symbol (e.g., as shown in the table of FIG. 2) for the detected DTMF tone in step 408.

In step 410, the determined symbol is stored in the download buffer memory 250 and/or other appropriate location.

The end of the data stream is detected in step 412, be it a 'time-out', i.e., the absence of DTMF tones for a predetermined amount of time, the reception of a predetermined code, or the reception of a pre-designated control code such as a busy signal or a call waiting signal.

Error checking such as a cyclic redundancy checking (CRC) or check sum may be sent with the data and performed in step 414 after the data is received by the digital telephone device 700. If the data appears to contain an error, the processor 18 may prompt the user to restart the process shown in FIG. 3, e.g., via the display 27 shown in FIG. 1 or by an audible tone at the digital telephone device 700.

If the data was received properly, it may be moved from the download buffer memory area 250 to any appropriate location in the digital telephone device 700, e.g., to another location in the memory 200.

The present invention provides a technique for downloading any information capable of being represented digitally to a digital telephone device using DTMF tones. Thus, new programs for digital telephone devices including new features or software fixes may be downloaded after the equipment is installed. The technique does not require the expense of adding a modem to a digital telephone answering device, but rather makes use of common and inexpensive routines and elements such as a DTMF decoder 204 to download data.

Figures 4, 5:
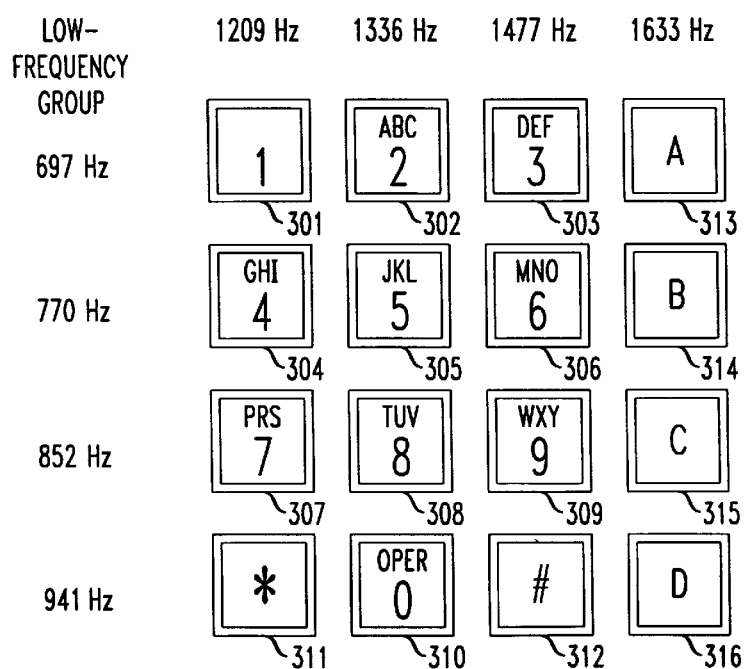
FIG. 4 is a table showing other conventional frequencies commonly used in North America.
FIG. 5 depicts the 16 combinations of the conventional row and column DTMF frequencies.

The DTMF download control module may make use of other tones other than the 16 DTMF tones commonly used in North America with respect to a 16 key keypad. For instance, FIG. 4 is a table showing other common tones and tone pairs which can typically be detected by a conventional DTMF decoder 204 such as that shown in FIG. 1. For instance, once the DTMF download control module 200 is invoked, a dial tone (350 Hz and 440 Hz) may be output by the data source to indicate the start of data, and another tone or tone pair, e.g., a call waiting tone of 440 Hz can indicate the end of the data. To provide additional reliability, a particular tone or tone pair such as a recording warning of 1400 Hz may be output by the data source in addition to or alternative to silence between the DTMF tones for each digit. Other possible tones for use in control of the data download include a busy signal (480 Hz and 620 Hz), a ring return signal (440 Hz and 480 Hz), or a CAS tone (2230 Hz and 2750 Hz).

The communication between the data source and the digital telephone device 700 may be entirely in a download direction toward the digital telephone device 700 after the DTMF download control module 200 is invoked, or the communication may be two-way. For instance, the DTMF generator 212 in the digital telephone device may be used to send control signals, e.g., an acknowledge signal after each digit, to the data source.

Of course, the utilized tones by the data source should preferably not interfere with the normal operations of the central office 13 or the public switched telephone network (PSTN) in general.

The present invention allows reprogrammability of a digital telephone device without removing the device from its installation, and/or without requiring disassembly of the digital telephone device to, e.g., access the memory.

While the invention has been described with reference to the exemplary embodiments thereof, those skilled in the art will be able to make various modifications to the described embodiments of the invention without departing from the true spirit and scope of the invention.

What is claimed is:

1. A method of receiving trickle downloaded data to update a program memory of a digital telephone device over a telephone line, comprising:

associating each of a plurality of unique dual tone multi frequency (DTMF) tone pairs with a unique symbol of a hexadecimal numeric system;

receiving a sequence of separate dual tone multi frequency (DTMF) tone pairs over said telephone line;

determining a sequence of separate digits of data based on said association of a plurality of unique dual tone multi frequency (DTMF) tone pairs with said unique symbol of said hexadecimal numeric system; and updating at least a block of said program memory of said digital telephone device with said sequence of separate digits of data.

2. The method of receiving trickle downloaded data to update a program memory of a digital telephone device according to claim 1, wherein:

said plurality of dual tone multi frequency tone pairs (DTMF) is 16 in number.

3. The method of receiving trickle downloaded data to update a program memory of a digital telephone device according to claim 2, further comprising:

providing a table associating each of 16 unique dual tone multi frequency (DTMF) tone pairs with a corresponding unique hexadecimal digit.

4. The method of receiving trickle downloaded data to update a program memory of a digital telephone device according to claim 2, further comprising:

providing a download buffer memory to temporarily store a sequence of a plurality of hexadecimal digits corresponding to said sequence of separate dual tone multi frequency (DTMF) tone pairs.

5. The method of receiving trickle downloaded data to update a program memory of a digital telephone device according to claim 2, further comprising:

determining a data stream and error checking information based on said association of said 16 unique dual tone multi frequency (DTMF) tone pairs with said unique digits of said hexadecimal numeric system; and performing an error check on said data stream based on said error checking information.

6. The method of receiving trickle downloaded data to update a program memory of a digital telephone device according to claim 1, further comprising:

receiving a tone indicating a start of said data.

7. The method of receiving trickle downloaded data to update a program memory of a digital telephone device according to claim 1, wherein:

said dual tone multi frequency (DTMF) tone pairs are received from a telephone line interface.

8. The method of receiving trickle downloaded data to update a program memory of a digital telephone device according to claim 1, wherein said received sequence of separate dual tone multi frequency (DTMF) tone pairs comprises at least 25 sequentially transmitted dual tone multi frequency (DTMF) tone pairs.

9. A method of receiving trickle downloaded data to update a voice memory of a digital telephone device over a telephone line, comprising:

associating each of a plurality of unique dual tone multi frequency (DTMF) tone pairs with a unique symbol of a hexadecimal numeric system;

receiving a sequence of separate dual tone multi frequency (DTMF) tone pairs over said telephone line;

determining a sequence of separate digits of data based on association of said plurality of unique dual tone multi frequency (DTMF) tone pairs with said unique symbol of said hexadecimal numeric system; and updating at least a block of said voice memory of said digital telephone device with said sequence of separate digits of data.

10. The method of receiving trickle downloaded data to update a voice memory of a digital telephone device according to claim 9, wherein:

said plurality of dual tone multi frequency tone pairs (DTMF) is 16 in number.

11. The method of receiving trickle downloaded data to update a voice memory of a digital telephone device according to claim 10, further comprising:

providing a table associating each of 16 unique dual tone multi frequency (DTMF) tone pairs with a corresponding unique hexadecimal digit.

12. The method of receiving trickle downloaded data to update a program memory of a digital telephone device according to claim 10, further comprising:

providing a download buffer memory to temporarily store a sequence of a plurality of hexadecimal digits corresponding to said sequence of separate dual tone multi frequency (DTMF) tone pairs.

13. The method of receiving trickle downloaded data to update a voice memory of a digital telephone device according to claim 10, further comprising:

determining a data stream and error checking information based on said association of said 16 unique dual tone multi frequency (DTMF) tone pairs with said unique digits of said hexadecimal numeric system; and performing an error check on said data stream based on said error checking information.

14. The method of receiving trickle downloaded data to update a voice memory of a digital telephone device according to claim 9, further comprising:

receiving a tone indicating a start of said data.

15. The method of receiving trickle downloaded data to update a voice memory of a digital telephone device according to claim 9, wherein:

said dual tone multi frequency (DTMF) tone pairs are received from a telephone line interface.

16. The method of receiving trickle downloaded data to update a voice memory of a digital telephone device according to claim 9, wherein said received sequence of separate dual tone multi frequency (DTMF) tone pairs comprises at least 25 sequentially transmitted dual tone multi frequency (DTMF) tone pairs.

17. A method of downloading data over a telephone line to update a program memory of a digital telephone device, said method comprising:

associating in said digital telephone device each of 16 unique dual tone multi frequency (DTMF) tone pairs with a unique symbol of a hexadecimal numeric system;

establishing a telephone interconnection between said digital telephone device and a data source;

receiving in said digital telephone device a sequence of unique dual tone multi frequency (DTMF) tones from said data source;

determining a data stream based on association of said dual tone multi frequency (DTMF) tone pairs with said symbol of said hexadecimal numeric system; and updating program memory in said digital telephone device with said data stream.

18. A method of downloading data over a telephone line to update a voice memory of a digital telephone device, said method comprising:

associating in said digital telephone device each of 16 unique dual tone multi frequency (DTMF) tone pairs with a unique symbol of a hexadecimal numeric system;

establishing a telephone interconnection between said digital telephone device and a data source;

receiving in said digital telephone device a sequence of unique dual tone multi frequency (DTMF) tones from said data source;

determining a data stream based on association of said dual tone multi frequency (DTMF) tone pairs with said symbol of said hexadecimal numeric system; and updating voice memory in said digital telephone device with said data stream.

19. A data download receiver adapted to receive data downloaded to update a program memory in a digital telephone device, said data download receiver comprising:
- a dual tone multi frequency (DTMF) decoder;
- a table associating each pair of sixteen unique dual tone multi frequency (DTMF) tone pairs with a corresponding unique hexadecimal digit;
- a program memory; and
- a download control module adapted to receive a sequence of unique dual tone multi frequency (DTMF) tone pairs, to determine a sequence of hexadecimal digits corresponding to said sequence of dual tone multi frequency (DTMF) tone pairs, and to update said program memory with said hexadecimal digits.

20. The data download receiver in a digital telephone device according to claim 19, further comprising:
- a telephone line interface, said sequence of dual tone multi frequency (DTMF) tone pairs being received from said telephone line interface.

21. The data download receiver in a digital telephone device according to claim 19, further comprising:
- a download buffer memory to receive said sequence of hexadecimal digits corresponding to said sequence of dual tone multi frequency (DTMF) tone pairs.

22. The data download receiver in a digital telephone device according to claim 19, further comprising:
- said sequence of dual tone multi frequency (DTMF) tone pairs comprises at least 25 DTMF sequentially transmitted dual tone multi frequency (DTMF) tone pairs.

23. A data download receiver adapted to receive data downloaded to update a voice memory in a digital telephone device, said data download receiver comprising:
- a dual tone multi frequency (DTMF) decoder;
- a table associating each pair of sixteen unique dual tone multi frequency (DTMF) tone pairs with a corresponding unique hexadecimal digit;
- a program memory; and
- a download control module adapted to receive a sequence of unique dual tone multi frequency (DTMF) tone pairs, to determine a sequence of hexadecimal digits corresponding to said sequence of dual tone multi frequency (DTMF) tone pairs, and to update said voice memory with said hexadecimal digits.

24. The data download receiver in a digital telephone device according to claim 23, further comprising:
- a telephone line interface, said sequence of dual tone multi frequency (DTMF) tone pairs being received from said telephone line interface.

25. The data download receiver in a digital telephone device according to claim 23, further comprising:
- a download buffer memory to receive said sequence of hexadecimal digits corresponding to said sequence of dual tone multi frequency (DTMF) tone pairs.

26. The data download receiver in a digital telephone device according to claim 23, further comprising:
- said sequence of dual tone multi frequency (DTMF) tone pairs comprises at least 25 DTMF sequentially transmitted dual tone multi frequency (DTMF) tone pairs.

27. Apparatus for receiving trickle downloaded data over a telephone line used to update program memory of a digital telephone device, comprising:
- means for associating each of 16 unique dual tone multi frequency (DTMF) tone pairs with a unique symbol of a hexadecimal numeric system;
- means for receiving a sequence of separate dual tone multi frequency (DTMF) tone pairs over said telephone line;
- means for determining a data stream and error checking information based on association performed by said means for associating;
- means for performing an error check on said data stream based on said error checking information; and
- means for updating program memory with said data stream.

28. Apparatus for receiving trickle downloaded data over a telephone line used to update voice memory of a digital telephone device, comprising:
- means for associating each of 16 unique dual tone multi frequency (DTMF) tone pairs with a unique symbol of a hexadecimal numeric system;
- means for receiving a sequence of separate dual tone multi frequency (DTMF) tone pairs over said telephone line;
- means for determining a data stream and error checking information based on said association performed by said means for associating;
- means for performing an error check on said data stream based on said error checking information; and
- means for updating voice memory with said data stream.

* * * * *